US011347629B2

(12) United States Patent
Sharma et al.

(10) Patent No.: US 11,347,629 B2
(45) Date of Patent: May 31, 2022

(54) FORECASTING A QUALITY OF A SOFTWARE RELEASE USING MACHINE LEARNING

(71) Applicant: Dell Products L. P., Round Rock, TX (US)

(72) Inventors: Rohan Sharma, Delhi (IN); Sathish Kumar Bikumala, Round Rock, TX (US); Sibi Philip, Bangalore (IN); Kiran Kumar Gadamshetty, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/176,929

(22) Filed: Oct. 31, 2018

(65) Prior Publication Data

US 2020/0133830 A1    Apr. 30, 2020

(51) Int. Cl.
*G06F 11/36* (2006.01)
*G06Q 10/04* (2012.01)
(Continued)

(52) U.S. Cl.
CPC ...... *G06F 11/3692* (2013.01); *G06F 11/3676* (2013.01); *G06N 20/00* (2019.01); *G06Q 10/04* (2013.01); *G06Q 10/06312* (2013.01)

(58) Field of Classification Search
CPC ............. G06F 11/3664; G06F 11/3668; G06F 11/3672; G06F 11/3676; G06F 11/3692;
(Continued)

(56) References Cited

U.S. PATENT DOCUMENTS 5,671,415 A * 9/1997 Hossain ............... G06F 8/20
700/96
6,745,150 B1 * 6/2004 Breiman ............ G06Q 10/06
702/181
(Continued)

OTHER PUBLICATIONS

V. Radziukynas and A. Klementavicius, "Short-term wind speed forecasting with ARIMA model," 2014 55th International Scientific Conference on Power and Electrical Engineering of Riga Technical University (RTUCON), Riga, 2014, pp. 145-149, doi: 10.1109/RTUCON.2014.6998223. (Year: 2014).*

(Continued)

*Primary Examiner* — Andrew M. Lyons
(74) *Attorney, Agent, or Firm* — Krishnendu Gupta; Deepika Bhayana; Derek Lam

(57) ABSTRACT

In some examples, a server may retrieve and parse test results associated with testing a software package. The server may determine a weighted sum of a software feature index associated with a quality of the plurality of features, a defect index associated with the defects identified by the test cases, a test coverage index indicating a pass rate of the plurality of test cases, a release release reliability index associated with results of executing regression test cases included in the test cases, and an operational quality index associated with resources and an environment associated with the software package. The server may use a machine learning algorithm, such as a time series forecasting algorithm, to forecast a release status of the software package. The server may determine, based on the release status, whether the software package is to progress from a current phase to a next phase of a development cycle.

20 Claims, 6 Drawing Sheets

(51) Int. Cl.
*G06Q 10/06* (2012.01)
*G06N 20/00* (2019.01)
(58) Field of Classification Search
CPC ....... G06F 11/36–3696; G06F 8/70–77; G06N 20/00; G06Q 10/04; G06Q 10/0632–06395
See application file for complete search history.

(56) References Cited

U.S. PATENT DOCUMENTS

| | | | | |
|---|---|---|---|---|
| 8,635,590 | B1* | 1/2014 | Ogilvie | G06F 9/44521 717/110 |
| 8,874,409 | B2* | 10/2014 | Dhurandhar | G06Q 10/04 702/179 |
| 9,613,309 | B1* | 4/2017 | Apreleva | G06Q 40/06 |
| 9,619,363 | B1* | 4/2017 | Chitale | G06F 11/3692 |
| 10,318,874 | B1* | 6/2019 | Duncan | G06N 20/00 |
| 10,354,210 | B2* | 7/2019 | Kour | G06Q 10/06313 |
| 2001/0013008 | A1* | 8/2001 | Waclawski | G06F 11/3409 702/186 |
| 2008/0249752 | A1* | 10/2008 | Keller | G06F 17/18 703/2 |
| 2009/0138843 | A1* | 5/2009 | Hinton | G06F 8/74 717/101 |
| 2012/0180027 | A1* | 7/2012 | Yu | G06F 11/3664 717/126 |
| 2012/0197626 | A1* | 8/2012 | Kejariwal | G06F 11/3466 703/22 |
| 2013/0046559 | A1* | 2/2013 | Coleman | G06Q 10/10 705/4 |
| 2013/0198147 | A1* | 8/2013 | Jain | G06F 40/216 707/688 |
| 2013/0311968 | A1* | 11/2013 | Sharma | G06Q 10/06 717/101 |
| 2013/0326465 | A1* | 12/2013 | Jain | G06F 8/77 717/100 |
| 2013/0326467 | A1* | 12/2013 | Nair | G06F 11/3664 717/101 |
| 2014/0146078 | A1* | 5/2014 | Pompey | G06T 11/206 345/629 |
| 2014/0282406 | A1* | 9/2014 | Narasimhan | G06F 11/008 717/124 |
| 2015/0082277 | A1* | 3/2015 | Champlin-Scharff | G06F 9/454 717/120 |
| 2015/0254125 | A1* | 9/2015 | Kakui | G06F 11/0709 714/47.3 |
| 2016/0034615 | A1* | 2/2016 | Heda | G06F 17/18 703/2 |
| 2016/0055079 | A1* | 2/2016 | Hanna | G06F 11/3692 717/135 |
| 2016/0202228 | A1* | 7/2016 | Ba | G01N 33/18 702/50 |
| 2016/0224453 | A1* | 8/2016 | Wang | G06F 11/3604 |
| 2016/0307133 | A1* | 10/2016 | Kour | G06Q 10/06313 |
| 2017/0235569 | A1* | 8/2017 | Sturtevant | G06Q 40/12 717/102 |
| 2017/0344393 | A1* | 11/2017 | Ansari | G06F 9/45558 |
| 2017/0364352 | A1* | 12/2017 | Cmielowski | G06Q 10/06 |
| 2018/0150783 | A1* | 5/2018 | Xu | G06N 20/00 |
| 2018/0175790 | A1* | 6/2018 | Sanfilippo | H02S 50/10 |
| 2018/0225391 | A1* | 8/2018 | Sali | G06F 17/50 |
| 2018/0275986 | A1* | 9/2018 | Ghosh | G06F 8/70 |
| 2018/0276372 | A1* | 9/2018 | Crabtree | H04L 63/1425 |
| 2018/0300180 | A1* | 10/2018 | Shepard | G06F 11/0793 |
| 2018/0307593 | A1* | 10/2018 | Assulin | G06F 8/71 |
| 2018/0341571 | A1* | 11/2018 | Kislovskiy | G06F 11/3664 |
| 2019/0026106 | A1* | 1/2019 | Burton | G06F 8/71 |
| 2019/0050515 | A1* | 2/2019 | Su | G06N 3/0454 |
| 2019/0087228 | A1* | 3/2019 | Ross | G06F 11/3086 |
| 2019/0095320 | A1* | 3/2019 | Biswas | G06F 11/3688 |
| 2019/0129712 | A1* | 5/2019 | Hawrylo | G06F 8/70 |
| 2019/0149424 | A1* | 5/2019 | O'Neill | H04L 41/14 709/224 |
| 2019/0156953 | A1* | 5/2019 | Chen | G06K 9/6267 |
| 2019/0205542 | A1* | 7/2019 | Kao | G06F 8/70 |
| 2019/0253328 | A1* | 8/2019 | Kolar | H04L 41/147 |
| 2019/0266076 | A1* | 8/2019 | Maliani | G06F 11/3684 |
| 2019/0294525 | A1* | 9/2019 | Scheiner | G06F 11/3608 |
| 2019/0294531 | A1* | 9/2019 | Avisror | G06F 11/3676 |
| 2020/0027105 | A1* | 1/2020 | Ling | G06N 20/00 |
| 2020/0034745 | A1* | 1/2020 | Nagpal | G06N 20/00 |

OTHER PUBLICATIONS

A. K. Singh, Ibraheem, S. Khatoon, M. Muazzam and D. K. Chaturvedi, "Load forecasting techniques and methodologies: A review," 2012 2nd International Conference on Power, Control and Embedded Systems, Allahabad, 2012, pp. 1-10, doi: 10.1109/ICPCES.2012.6508132. (Year: 2012).*

J. Zhao, L. Xu and L. Liu, "Equipment Fault Forecasting Based on ARMA Model," 2007 International Conference on Mechatronics and Automation, Harbin, 2007, pp. 3514-3518, doi: 10.1109/ICMA.2007.4304129. (Year: 2007).*

A. Porter, C. Yilmaz, A. M. Memon, D. C. Schmidt and B. Natarajan, "Skoll: A Process and Infrastructure for Distributed Continuous Quality Assurance," in IEEE Transactions on Software Engineering, vol. 33, No. 8, pp. 510-525, Aug. 2007, doi: 10.1109/TSE.2007.70719. (Year: 2007).*

Sangeeta and K. Sharma, "A statistical view of software reliability and modeling," 2015 2nd International Conference on Computing for Sustainable Global Development (INDIACom), 2015, pp. 1726-1730. (Year: 2015).*

* cited by examiner

200

| RELEASE RELIABILITY INDEX 126 | RELEASE STATUS 128 |
|---|---|
| TEST CASES 108 | TEST RESULTS 110 |

SOFTWARE FEATURE INDEX 116
- FEATURE ACCURACY 202
- DELAYED FEATURES 204

DEFECT INDEX 118
- NUMBER OF DEFECTS 206
- PRIORITY OF DEFECTS 210
- SEVERITY OF DEFECTS 208
- TEST CYCLE 212

TEST COVERAGE INDEX 120
- PASSED TEST CASES 214
- FAILED TEST CASES 216

RELIABILITY INDEX 122
- REGRESSION TESTING RESULTS 218

OPERATIONAL QUALITY INDEX 124
- RESOURCES 220
- ENVIRONMENT 222

FIG. 2

FORECASTING A QUALITY OF A SOFTWARE RELEASE USING MACHINE LEARNING

BACKGROUND OF THE INVENTION

Field of the Invention

This invention relates generally to computing devices and, more particularly, to determining, using machine learning, whether a software package is ready to proceed to a next phase in a release process including whether the software package is ready to be released to customers.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Prior to a software package (e.g., software release) being released to customers, the software package may undergo various milestones during the development cycle. Typically, project managers have regular meetings to determine the readiness of the software package to progress to the next milestone in the development cycle. However, such an approach relies of the "gut feel" of the project managers rather than quantitative measurements to determine the readiness of the software package.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may retrieve and parse test results associated with a software package comprising a plurality of features to create parsed data. Based on the parsed data, the server may determine a weighted sum of a software feature index associated with a quality of the plurality of features, a defect index associated with the defects identified by the test cases, a test coverage index indicating a pass rate of the plurality of test cases, a release reliability index associated with results of executing regression test cases included in the test cases, and an operational quality index associated with resources and an environment associated with the software package. The server may use a machine learning algorithm, such as an auto regressive integrated moving average (ARIMA) time series forecasting algorithm, to forecast a release status of the software package. The server may determine, based on the release status, whether the software package is to progress from a current phase to a next phase of a development cycle.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 2 is a block diagram of a system that includes data used to determine various indicators associated with a software package, according to some embodiments.

DETAILED DESCRIPTION

Figure 1:
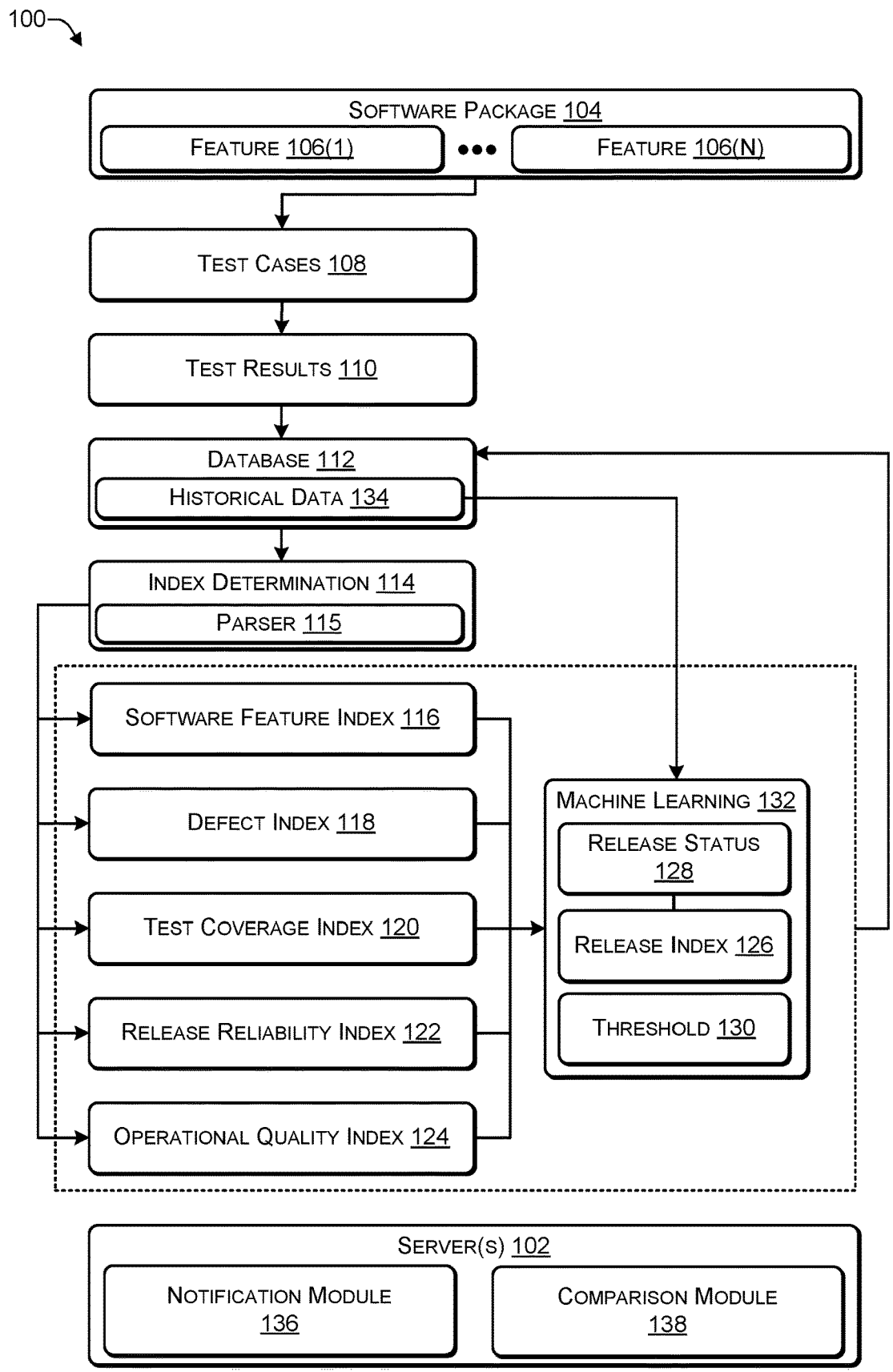
FIG. 1 is a block diagram of a system that includes a release index and a release status associated with a software package, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein predict the quality of a software package at a particular point in time in the development process. For example, a release index and a release status may be predicted using a machine learning algorithm such as, for example, a time series modeling algorithm. The release index may be a numerical score that considers various factors associated with the software package. The release index may be determined using a weighted sum of multiple individual indexes that measure different aspects of the software package. In some cases, the numerical score may be scaled ("normalized") to be within a particular range, such as an integer between 0 and 100, a decimal value between 0 and 1, or the like. The release status may be determined based on the release index and may indicate whether or not the software package is ready to progress to the next phase. For example, a software development process may include various phases, such as, for example, development independent testing (DIT), system integration testing (SIT), user acceptance testing (UAT), and production (e.g., ready to provide to customers). DIT, also known as unit testing, involves testing a software unit (e.g. a component) of a software package to determine whether the software unit performs its intended function(s). SIT involves testing the integration of multiple units (e.g., components) of a software package to determine whether the components are seamlessly integrated, e.g., whether the components interact smoothly with other components of the software package. UAT, also known as beta testing, involves actual end users testing a software package to verify that the software package works for the user (e.g., provides the intended functionality from the user's perspective) and tests whether the user accepts the software package.

Testing of the software package may be performed every X hours (X>0, e.g., X=24) to produce test results. The systems and techniques may use the test results to predict a quality of the software package. For example, the release index (e.g., predicted quality) may be determined based on a software feature index that considers the number of features that have been implemented, the feature implementation accuracy (e.g., whether, based on testing, the features provide the intended functionality), and the number of features that have not yet been implemented (e.g., features whose implementation is not yet complete). The release index may be determined based on a defect (e.g., error) index that considers the number of open (e.g., currently known) defects, the severity of the open defects, the priority of the open defects, and the portion of the development cycle in which the defect was discovered. The release index may be determined based on a test coverage index that considers a number of test cases that passed and a number of test cases that failed. The release index may be determined based on a release reliability index that considers results of regression testing. Regression testing involves testing the functions of a software package to determine whether the software provides the functionality of previous software releases. For example, a new version of a software package may include new features in addition to an existing set of features. Regression testing checks to determine whether the new features adversely impact the existing set of features. The release index may be determined based on an operational quality index that considers resources and an environment. To deploy and release a software change into production, multiple human resources are involved, e.g., a person who deploys the change, another person who validates, and so on. The resources in the operational quality index refers to the human resources to perform the tasks to produce a software package for release to customers. A software application (e.g., unit) may be installed in an environment of multiple configurations, integration touch points, infrastructures, and other software applications. The environment in the operational quality index refers to environmental factors involved in integrating one piece of software to other pieces of software, such as how the environment is configured, and the like.

The machine learning algorithm may use a time series modeling algorithm, such as, for example, Auto-Regressive Integrated Moving Average (ARIMA). For example, data points may be collected over a period of time and analyzed to determine a pattern (e.g., trend) that is used to predict future values.

As an example, a server may include one or more processors and one or more non-transitory computer readable media storing instructions executable by the one or more processors to perform various operations. For example, the operations may include retrieving test results associated with a software package comprising a plurality of features. The test results may be created by executing a plurality of test cases to test the plurality of features. The operations may include parsing the test results to create parsed data.

The operations may include determining, based on the parsed data, a software feature index associated with a quality of the plurality of features. For example, the software feature index may be determined based at least in part on: (i) an implementation accuracy associated with each feature of the plurality of features and (ii) a number of unimplemented features in the software package. The operations may include determining, based on the parsed data, a defect index associated with the defects identified by the test cases. For example, the defect index may be determined based at least in part on: (i) a number of current defects, (ii) a severity of the current defects, (iii) a priority of the current defects, and (iv) the current phase in the development cycle in which the current defects were determined.

The operations may include determining, based on the parsed data, a test coverage index indicating a pass rate of the plurality of test cases. The operations may include determining, based on the parsed data, a release reliability index associated with results of executing regression test cases included in the test cases. The operations may include determining, based on the parsed data, an operational quality index associated with resources and an environment associated with the software package. The operations may include determining a release index based at least in part on (i) the software feature index, (ii) the defect index, (iii) the test coverage index, (iv) the release reliability index, and (v) the operational quality index. For example, determining the release index may include determining a sum (e.g., a weighted sum) of: (i) multiplying a first weight with the software feature index, (ii) multiplying a second weight with the defect index, (iii) multiplying a third weight with the test coverage index, (iv) multiplying a fourth weight with the release reliability index, and (v) multiplying a fifth weight with the operational quality index.

The operations may include predicting, by a machine learning algorithm, a release status of the software package based at least in part (i) on the release index and (ii) on at least one previously determined release index. The operations may include determining that the release status satisfies a predetermined threshold. The operations may include determining, based at least in part on the release status, that the software package is to progress from a current phase to a next phase of a development cycle. The development cycle may include a development independent testing phase, a system integration phase, a user acceptance testing phase, and a production phase. The operations may include determining, in the next phase, a second release index based on a second weighted sum of a second software feature index, a second defect index, a second test coverage index, a second release reliability index, and a second operational quality index. The operations may include forecasting, using a machine learning algorithm, a second release status of the software package based on the second release index, the release index, and the at least one previously determined release index. For example, the machine learning may comprise an auto regressive integrated moving average (ARIMA) time series forecasting algorithm. The operations may include determining that the second release status fails to satisfy a second predetermined threshold. The operations may include modifying one or more features of the software package.

FIG. 1 is a block diagram of a system 100 that includes a release index and a release status associated with a software package, according to some embodiments. A server 102 may host (i) data and (ii) software applications to perform various calculations using the data to determine various indices, as described herein.

A software package 104 may include multiple features, such as a feature 106(1) to a feature 106(N) (N>0). The software package 104 may be tested using multiple test cases 108 to produce test results 110 that are stored in a database 112.

An index determination module 114 may retrieve the test results 110 from the database 112, parse the test results 110 using a parser 115, and determine (e.g., predict) a software feature index 116, a defect index 118, a test coverage index 120, a release reliability index 122, and an operational quality index 124. The software feature index 116 (sometimes referred to as a software requirement index) provides a numerical representation of a status of the features 106 that are to be included in the software package 104. The defect index 118 (sometimes referred to as a remaining defect index or open defects index) provides a numerical representation of currently unresolved (e.g., open) defects that considers a severity of each defect, a priority of each defect, and a phase of a development cycle in which the defect is occurring). The test coverage index 120 provides a numerical representation of how many test cases have passed out of the total number of test cases that have been executed. The release reliability index 122 provides a numerical representation associated with previously implemented features based on regression testing. The operational quality index 124 provides a numerical representation of issues related to human resources and the development environment. A machine learning module 132 may determine (e.g., predict or forecast) a release index 126 and a release status 128 based on one or more of the software feature index 116, the defect index 118, the test coverage index 120, the release reliability index 122, and the operational quality index 124 and historical data 134. For example, the historical data 134 may include previously determined values of the indices 116, 118, 120, 122, 124, 126, and 128. As previously mentioned, the test cases 108 may be executed periodically (e.g., every day) and the test results 110 may be used to periodically (e.g., every day) determine the indices 116, 118, 120, 122, 124, 126, and 128. The historical data 134 may include the previous values of the indices 116, 118, 120, 122, 124, 126, and 128 associated with the software package 104. For example, the machine learning module 132 may use the historical data 134 to forecast the release status 128.

The software feature index 116 is determined based on the number of features that have been implemented, the feature implementation accuracy (e.g., whether, based on testing, the features provide the intended functionality), and the number of features that have not yet been implemented (e.g., features whose implementation is not yet complete). The defect (e.g., error) index 118 is determined based on the number of open (e.g., currently known) defects, the severity of the open defects (e.g., errors), the priority of the open defects, and the portion of the development cycle in which the defect was discovered. The test coverage index 120 is determined based on a number of test cases that passed and a number of test cases that failed. The release reliability index 122 is determined based on the results of regression testing. The operational quality index 124 takes into consideration resources (e.g., human resources available to perform the tasks, such as testing, to release a software package) and environment (e.g., environmental factors involved in integrating one piece of software with other pieces of software, such as how the environment is configured, and the like).

The software feature index 116 may be determined by analyzing the features 106 and the associated test results 110 from the database 110. For example, the features 106 and the associated test results 110 may be counted and categorized, including how many features are delayed, how many features have been completed (e.g., delivered), and how many features are currently still under development. For example, the number of features 106 and feature-related data may be determined. The feature-related data may include a story point of each of the features 106, a development completion (e.g., delivery) date, and feature details, such as the name of the feature, a description of the feature, etc. A story point of a feature may take into consideration an amount of work to complete the feature, a complexity of the work, and any risks associated with the work. The features 106 and associated data may be gathered from a source code management product (e.g., Team Foundation Server (TFS), GitHub, Jira, or the like) that provides source code management, reporting, requirements management, project management, automated builds, lab management, testing and release management capabilities. GitHub, Jira. The source code management product may include the database 112 with records of the features 106, the test results 110 (e.g., including defects), the test cases 108, and the like. The features 106 are counted and categorized based on the story points and development completion (e.g., delivery) date. A software module may implement an algorithm to determine the number of previously delayed features 106, a number of the features 106 delayed on a current day, a number of stories delivered, a number of stories delivered on the current day, the number of stories in progress based on the story points and the development completion (delivery) date, and the like. This information may be used to determine a tag/feature Implementation. Using tag implementation, the software feature index 116 may be determined based on the story points of features and by comparing the number of stories delayed on the current day with the number of of stories delivered on the current day with respect to threshold limits of status (e.g., Red, Yellow & Green).

The defect index 118 may be determined by analyzing the number of errors found in the test results 110 associated with the features 106. For example, the errors may be categorized based on a severity of each error. To illustrate, if a feature does not work as intended than the severity may be high, if the feature works but is inconsistent and sometimes provides incorrect results then the severity may be medium, and if the feature works but there are minor issues (e.g., formatting is incorrect) then the severity may be low. Of course, other ranking systems besides high, medium, and low (e.g., red, yellow, green) may be used. In some cases, an importance of each feature may also be considered when determining severity. For example, errors associated with an important feature (e.g., ranked most important by customers) may be ranked high and errors associated with a relatively unimportant feature (e.g., ranked as relatively unimportant by customers) may be ranked low, regardless of severity. The number of defects and defect-related data, such as, severity, priority, created date, status (e.g., Open, Closed, Ready For SIT, Ready For UAT, Development Started, Ready for Testing etc.), title, description, cause etc. may be determined from a source code management product (e.g., TFS, GitHub, Jira, or the like). Each defect may be counted and categorized based on a severity (e.g., Sev1, Sev2, and the like) and a priority (e.g., P1, P2, P3, and the like). For example, defects may be categorized as Sev1P1, Sev1P2, Sev1P3, Sev2P1, Sev2P2, Sev2P3, Sev3P1, Sev3P2, Sev3P3, Sev4P1, Sev4P2, Sev4P3 based on the severity and the priority of each defect. The defect index 118 may be determined based on one of two ways, based on a SIT EXIT/UAT EXIT date. For example, a determination may be made whether it is the last 1-2 weeks of SIT/UAT. If it is the last 2 weeks based on SIT EXIT/UAT EXIT date then the Remaining Defect Index value may be determined based on counting the number of defects with defects of category Sev1P1, Sev1P2, Sev1P3, Sev2P1, Sev2P2, Sev2P3, Sev3P1. There should be fewer such types of defects of these categories in the last 2 weeks. If it is not the last 2 weeks then this may not be determined.

The defect index 118 may be determined in three stages. At a first stage, a number of the defects for each category (e.g., Sev1P1, Sev1P2, Sev1P3, Sev2P1, Sev2P2, Sev2P3, Sev3P1, Sev3P2, Sev3P3, Sev4P1, Sev4P2, Sev4P3) may be counted and based on the number of defects, each type of defect may be assigned a corresponding status. For example, StatusSev1P1 for Sev1P1 defect, StatusSev1P2 for Sev1P2 defect up to StatusSev4P3 for Sev4P3 defect. These variables may have one of three values, e.g., Red, Yellow, or Green based on the number of defects of that category and the severity and priority of that defect category. StatusSev1P1 is Red if there is at least one Sev1P1, e.g., indicating the presence of a very severe defect. StatusSev3P2 is Green even if there are three Sev3P2 defects because the severity and priority are lower. At a second stage, each StatusSev1P1, StatusSev1P2, StatusSev1P3 may be combined into a new status variable StatusSev1 with a value of either Red, Yellow, or Green based on the StatusSev1P1, StatusSev1P2 & StatusSev1P3 variable's value and various permutations which are determined based on various scenarios for that type of defect category. StatusSev2P1, StatusSev2P2 & StatusSev2P3 are similarly combined into status variable StatusSev2 and similarly for Sev3 & Sev4 category. At a third stage, StatusSev1, StatusSev2 & StatusSev3 may be combined into a new status variable called FinalStatus which has a value of either Red, Yellow, or Green. The FinalStatus is determined based on various scenarios for that type of defect category. The FinalStatus holds the value for the Remaining Defects Index Vector.

The test coverage index 120 may be determined by retrieving the test results 110 from the database 112 and determining how many test cases passed and how many test cases failed:

test case coverage=test cases that passed/((test cases that passed)+(test cases that failed))

In some cases, the current testing phase (e.g., DIT, SIT, UAT, production, or the like) may be considered when determining the test coverage index 120. For example, typically, the number of test cases that pass may increase as the software package progresses from DIT to SIT, from SIT to UAT, from UAT to production, and the like. Thus, a large number of test cases that fail may not be a major concern in DIT but may be more concerning in SIT and extremely concerning in UAT. Thus, test cases that fail in UAT may be given more weight than test cases that fail in SIT, and test cases that fail in SIT may be given more weight than test cases that fail in UAT. In some cases, the severity of the defects (e.g., high, medium, low or another type of severity classification system) may be considered when determining the test coverage index 120. For example, if a test case fails, the severity associated with the error may be taken into consideration. To illustrate, if a text case fails because a feature does not work as intended than the severity may be high, if the test cases fails because the feature works but is inconsistent or sometimes provides incorrect results then the severity may be medium, and if test case fails because the feature works but there are minor issues (e.g., formatting is incorrect) then the severity may be low.

The indices 116, 118, 120, 122, and 124 may be used to determine a release index 126. For example, the release index 126 may be determined based on a weighted sum of the indices 116, 118, 120, 122, and 124, as described in FIG. 3. The release index 126 may be used to determine a release status 128. For example, if the release index 126 satisfies a predetermined threshold 130 (e.g., 95%, 98%, or the like), then the release status 128 may indicate that the software package 104 is ready to be released. If the release index 126 does not satisfy the predetermined threshold 130 (e.g., 95%, 98%, or the like), then the release status 128 may indicate that the software package 104 is not to be released.

Testing of the software package 104 may be performed every X hours (X>0, e.g., X=24) to produce the test results 110. The indices 116, 118, 120, 122, 124, 126, and 128 may be determined every X hours using the index determination module 114. After the indices 116, 118, 120, 122, 124, 126, and 128 are determined, the indices may be stored in the database 112 (e.g., in the historical data 134). One or more of the indices 116, 118, 120, 122, 124, 126, and 128 may be plotted and used to perform time series forecasting using the machine learning module 132, as described herein. The indices 116, 118, 120, 122, 124, 126, and 128 may be determined in such a way that they are scaled to be between a particular range, e.g., an integer between 0 and P (e.g., P=100), a fraction between 0.00 or the like. The scaling may enable the indices to be plotted over a period of time.

A notification module 136 may send notifications (e.g., email, text message, instant message, or the like) associated with defect prone features (e.g., features that have been modified but continue to exhibit errors after the modifications), critical defects (e.g., defects to important features, features whose defects are affecting other features, and the like), problematic structured query language (SQL) identifiers prior to the software package 106 being deployed in a production environment. For example, the notification module 136 may send a notification based on detecting a defect of a feature that gets reopened and automatically alerts the programmer (e.g., owner) about similar defects that were raised earlier. A comparison module 138 may compare release indexes of previous releases and identify differentiating parameters. For example, improvements in a handful of features may dramatically improve the release index 126 while defects in a handful of features may dramatically decrease the release index 126. In some cases, the machine learning 132 may analyze previous trends to recognize triggers. For example, if the defect index 118 satisfies a predetermined threshold limit or identifies another potential issue, the machine learning 132 may instruct the notification module 136 to send an alert to a software development leader and/or a test leader.

FIG. 2 is a block diagram of a system 200 that includes data used to determine various indicators associated with a software package, according to some embodiments. Each of the indices 116, 118, 120, 122, and 124 may be determined based one or more factors, as described herein.

The software feature index 116 may be determined based on a feature accuracy (e.g., implementation accuracy) 202 and delayed features 204. The feature accuracy 202 may indicate, based on the test cases 108 and the test results 110, whether the features 106 provide the intended functionality. The delayed features 204 may identify a portion of the features 106 whose implementation has not yet been completed. For example, the number of test cases 108 that were not executed because the corresponding features have not yet been implemented (e.g., the implementations are not yet complete) may be used to determine the delayed features 204.

The defect (e.g., error) index 118 is determined based on a number of currently known defects (e.g., errors) 206, a severity of the defects 208, a priority of the defects 210, and a test cycle 212 in which the defect was discovered. For example, the test results 110 may be used to determine the number of defects 206, the severity of the defects 208, and the priority of the defects 210. For example, each defect may be categorized based on a severity. To illustrate, if a feature does not work as intended than the severity may be high, if the feature works but is inconsistent or provides incorrect results then the severity may be medium, and if the feature works but there are minor issues (e.g., formatting is incorrect) then the severity may be low. Of course, other ranking systems besides high, medium, and low (e.g., red, yellow, green) may be used. The priority of defects 210 may consider an important of a feature. For example, a feature may have a high priority if the feature is ranked high (e.g., in terms of desirability) by customers. In contrast, a feature may have a relatively low priority if the feature is ranked as relatively unimportant (e.g., not as desirable as other features) by customers. The test cycle 212 may specify where (which testing phase) in the software development cycle (e.g., DIT, SIT, UAT, production, or the like) the defect was discovered. For example, testing may discover a large number of defects initially, e.g., during DIT. However, after these defects have been addressed and as the software package moves to the next part of the test cycle, fewer defects may be identified. Thus, for example, a defect found during DIT may be considered less important (e.g., less critical) compared to a defect found during SIT and a defect found during SIT may be considered less important (e.g., less critical) compared to a defect found during UAT. For example, an error found during UAT may be considered very important and may influence the defect index 118 more than an error found during SIT or DIT. Similarly, an error found during SIT may be considered important and may influence the defect index 118 more than an error found during DIT.

The test coverage index 120 is determined based on a number of passed test cases 214 and a number of failed test cases. The test coverage index 120 may be determined by retrieving the test results 110 from the database 112 and determining how many test cases passed and how many test cases failed:

test coverage index 120=(passed test cases 214)/
((passed test cases 214)+(failed test cases 216))

The release release reliability index 122 is determined based on regression testing results 218. Regression testing involves testing the functions of a software package to determine whether the software provides the functionality of previous software releases. For example, a new version of a software package may include new features in addition to an existing set of features. Regression testing checks to determine whether the new features adversely impact the existing set of features or whether the existing set of features continue to work properly, as they did in an earlier software release. The regression testing results 218 may indicate whether any of the existing features have been impacted by the introduction of the new features in the software package.

The operational quality index 124 takes into consideration (1) resources 220, e.g., human resources available to perform the tasks, such as testing, to release a software package, and (2) environment 222, e.g., environmental factors involved in integrating one piece of software with other pieces of software, such as how the environment is configured, and the like. For example, the release index 126 may be a value between 0 and 1, with 0.00 indicating numerous issues (e.g., not ready) and 1.00 indicating no issues (e.g., ready). To illustrate, during DIT the release index 126 may be between a first range, e.g., between 0.00 and 0.49. When the release index 126 satisfies a first threshold, e.g., 0.50 or greater, then the software package may progress to SIT. During SIT, the release index 126 may be between a second range, e.g., 0.50 and 0.79. When the release index 126 satisfies a second threshold, e.g., 0.80 or greater, then the software package may progress to UAT. During UAT, the release index 126 may be between a third range, e.g., 0.80 and 0.99. When the release index 126 satisfies a third threshold, e.g., 0.95 (or 0.98) or greater, then the software package may progress to the next phase, e.g., production (e.g., ready to be released to customers).

For example, the release index 126 may be a value between 0 and 1, with 0.00 indicating numerous issues (e.g., not ready) and 1.00 indicating no issues (e.g., ready). To illustrate, during DIT the release index 126 may be between a first range, e.g., between 0.00 and 0.49. When the release index 126 satisfies a first threshold, e.g., 0.50 or greater, then the software package may progress to SIT. During SIT, the release index 126 may be between a second range, e.g., 0.50 and 0.79. When the release index 126 satisfies a second threshold, e.g., 0.80 or greater, then the software package may progress to UAT. During UAT, the release index 126 may be between a third range, e.g., 0.80 and 0.99. When the release index 126 satisfies a third threshold, e.g., 0.95 (or 0.98) or greater, then the software package may progress to the next phase, e.g., production (e.g., ready to be released to customers).

Figure 3:
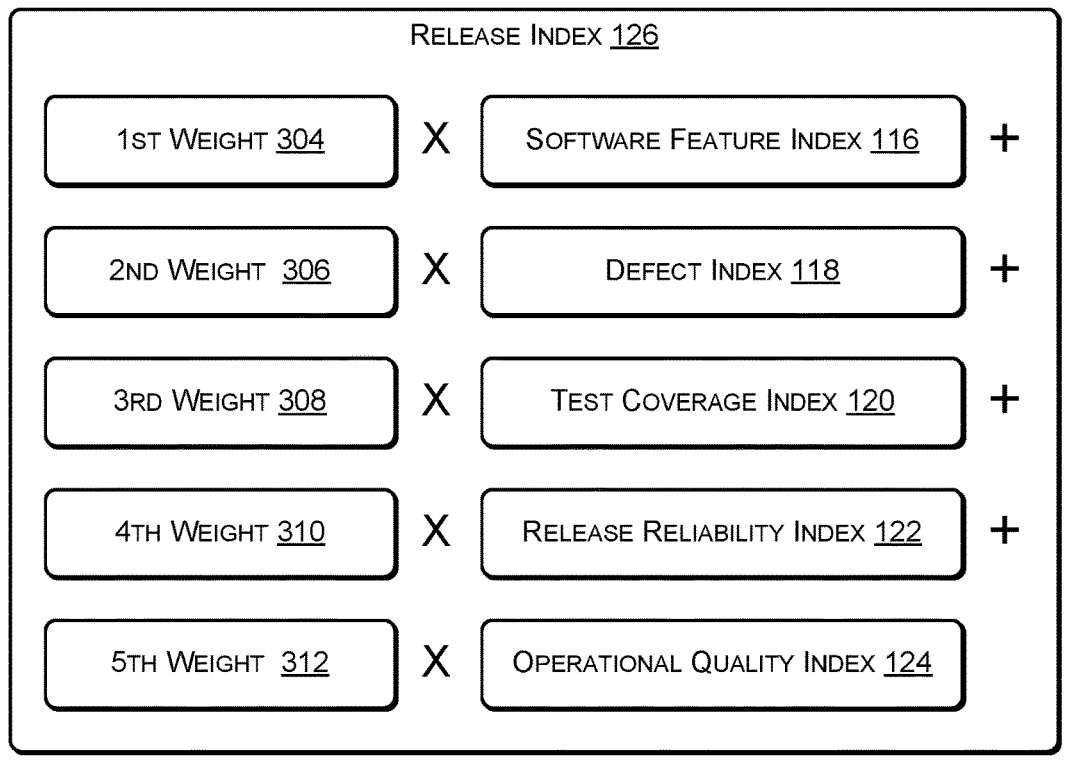
FIG. 3 is a block diagram of a system that includes a release index of a software package, according to some embodiments.

FIG. 3 is a block diagram of a system 300 that includes a software readiness index of a software package, according to some embodiments. The release index 126 may be determined as a weighted sum of the software feature index 116, the defect index 118, the test coverage index 120, the release reliability index 122, and the operational quality index 124. For example, the release index 126 may be determined by summing: (1) a first weight 304 multiplied by the software feature index 116, (2) a second weight 306 multiplied by the defect index 118, (3) a third weight 308 multiplied by the test coverage index 120, (4) a fourth weight 310 multiplied by the release reliability index 122, and (5) a fifth weight 312 multiplied by the operational quality index 124. The value of each of the weights 304, 306, 308, 310, 312 may be selected based of an importance of each weight.

For example, assume the weights 304, 306, 308, 310, 312 have a value of 1, 2, or 3 (e.g., 1=low importance, 2=medium importance, 3=high importance). Assume that each of the indices 116, 118, 120, 122, 124 has a score between 1 and 3 (e.g., 1=many defects, 2=some defects, 3=few or no defects). The resulting score may be scaled to a value between 0 and 100 by dividing the actual score by the highest possible score (e.g., 36 in this example). During DIT, the release index 126 may have a value of 33 out of 100 (e.g., 33%) based on the values in Table 1.

TABLE 1

|  | Weight | Score | Weighted Score | Maximum Possible |
|---|---|---|---|---|
| Software Index 116 | 3 | 1 | 3 | 9 |
| Defects Index 118 | 3 | 1 | 3 | 9 |
| Test Coverage Index 120 | 3 | 1 | 3 | 9 |
| Rel. Reliability index 122 | 2 | 1 | 2 | 6 |
| Op. Quality Index 124 | 1 | 1 | 1 | 3 |
| Release Index 126 |  |  | 12 (out of 36) = 33% | 36 |

During SIT, the release index 126 may have a value of 66 out of 100 (e.g., 66%) based on the values in Table 2.

TABLE 2

|  | Weight | Score | Weighted Score | Maximum Possible |
|---|---|---|---|---|
| Software Index 116 | 3 | 2 | 6 | 9 |
| Defects Index 118 | 3 | 2 | 6 | 9 |
| Test Coverage Index 120 | 3 | 2 | 6 | 9 |
| Rel. Reliability index 122 | 2 | 2 | 4 | 6 |
| Op. Quality Index 124 | 1 | 2 | 2 | 3 |
| Release Index 126 |  |  | 24 (out of 36) = 66% | 36 |

During UAT, the release index 126 may have a value of 91 out of 100 (e.g., 91%) based on the values in Table 3.

TABLE 3

|  | Weight | Score | Weighted Score | Maximum Possible |
|---|---|---|---|---|
| Software Index 116 | 3 | 3 | 9 | 9 |
| Defects Index 118 | 3 | 3 | 9 | 9 |
| Test Coverage Index 120 | 3 | 3 | 9 | 9 |
| Rel. Reliability index 122 | 2 | 3 | 4 | 6 |
| Op. Quality Index 124 | 1 | 3 | 2 | 3 |
| Release Index 126 |  |  | 33 (out of 36) = 91% | 36 |

Thus, as the software package progressed through the development cycle, e.g., from DIT to SIT, from SIT to UAT, and from UAT to production (e.g., ready for customers), the value of the release index 126 may increase. Once the release index 126 satisfies a threshold amount (e.g., 90%, 95%, 98%, 99%), the software package may be considered ready to be released to customers.

Figure 4:
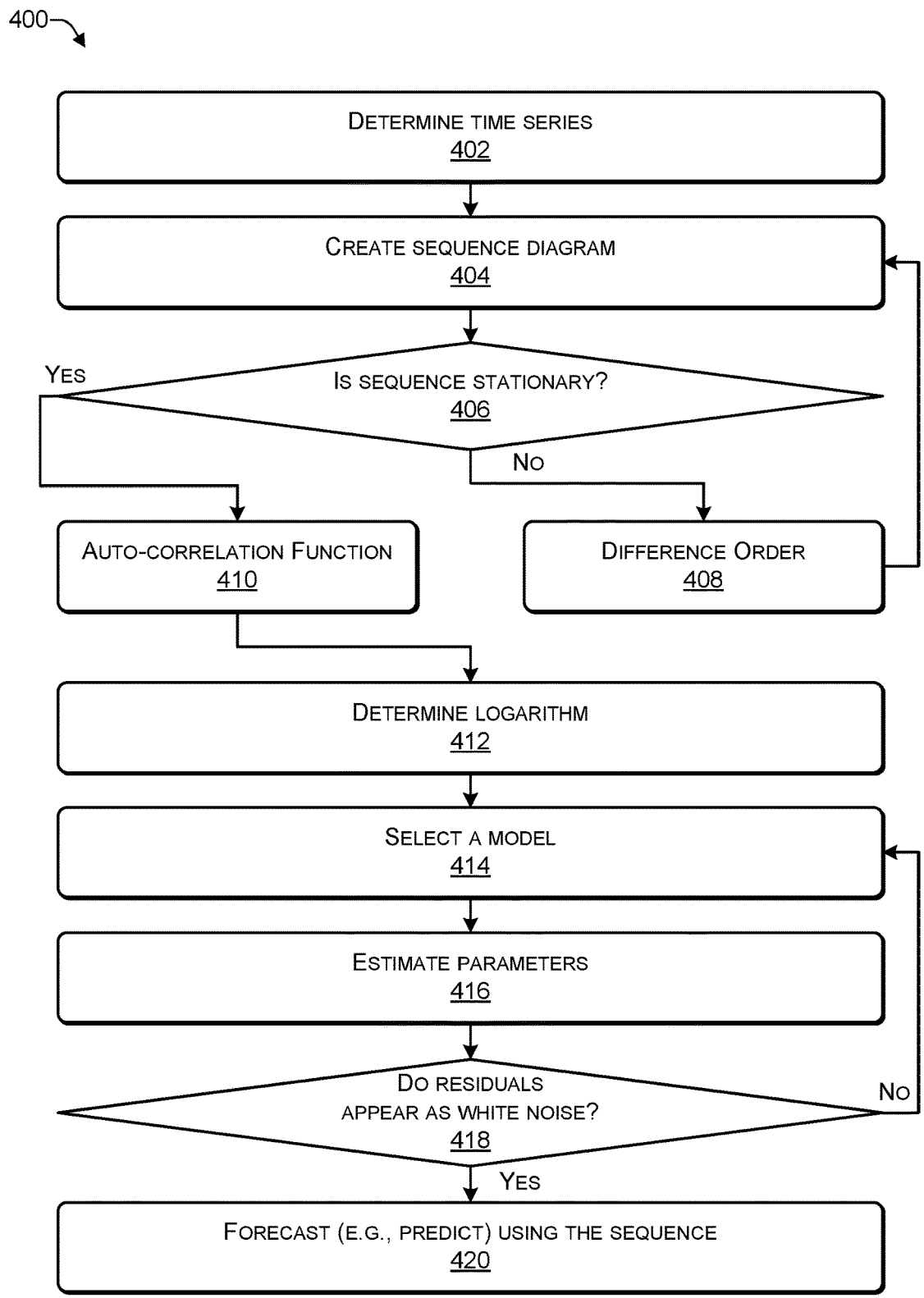
FIG. 4 is a flowchart of a process to perform time series forecasting, according to some embodiments.
Figure 5:
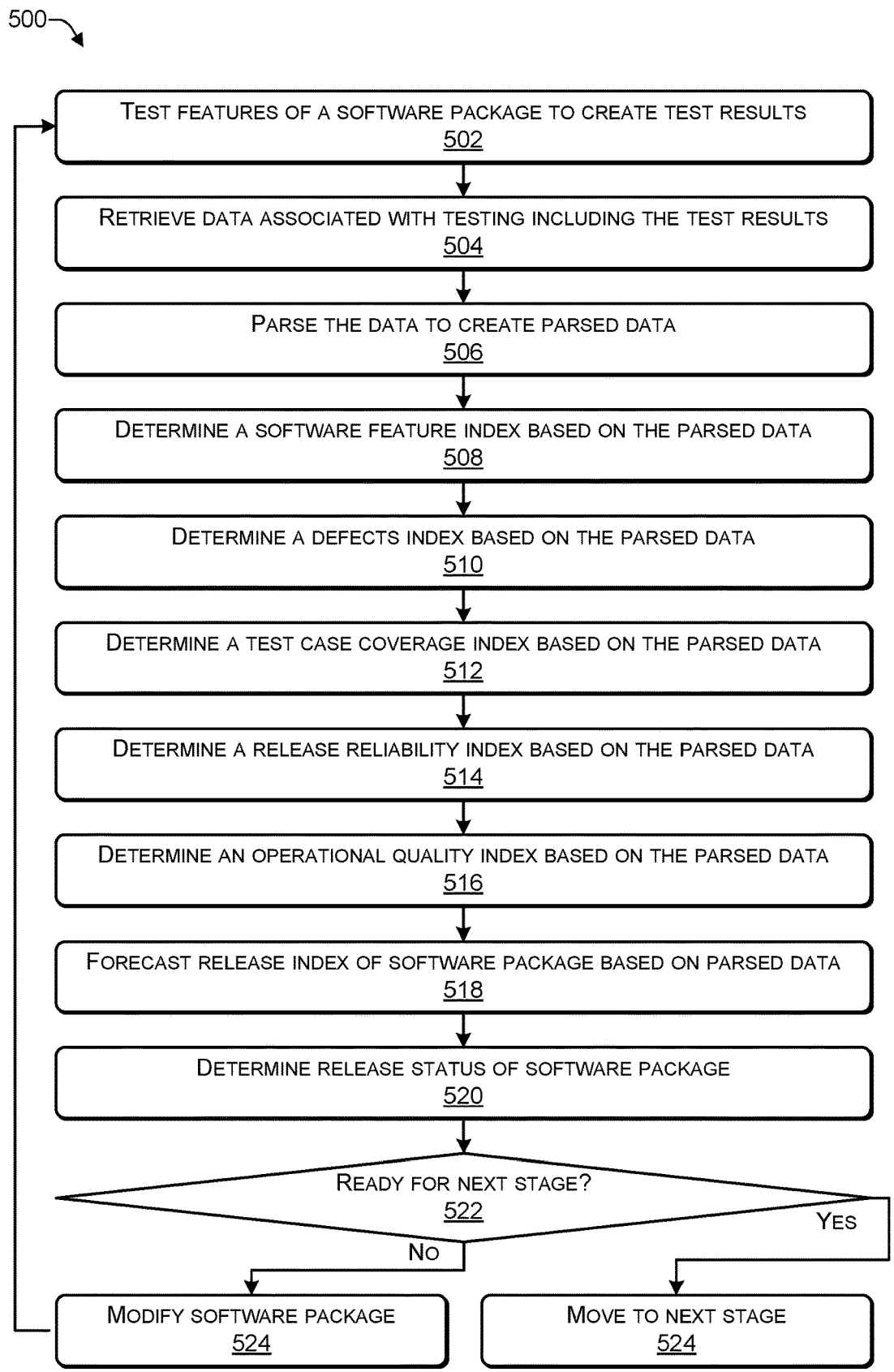
FIG. 5 is a flowchart of a process that includes determining a release index and a release status of a software package, according to some embodiments.

In the flow diagram of FIGS. 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIGS. 1, 2, and 3, as described above, although other models, frameworks, systems and environments may be used to implement these processes.

FIG. 4 is a flowchart of a process 400 to perform time series forecasting, according to some embodiments. For example, time series forecasting performed by the machine learning module 132 of FIG. 1 may include non-seasonal auto regressive integrated moving average (ARIMA) model for time series forecasting (e.g., predicting).

At 402, a time series may be determined (e.g. acquired). For example, data (e.g., the features 106, the test cases 108, the test results 110, and the like) may be retrieved from the database 112.

At 404, a sequence diagram may be created. For example, testing may be performed every X hours (e.g., X=24, 48, 72, or the like) and the release index 126 may be determined every X hours. The values of the release index 126 may be plotted over time (e.g., hours on the X-axis and value of the release index 126 on the Y-axis).

At 406, a determination may be made whether the sequence is stationary. A sequence (e.g., time series) is stationary when the statistical properties of the sequence, such as, for example, mean, variance, covariance, autocorrelation, and the like, are constant over time.

If a determination is made, at 406, that the sequence is not stationary, then the process may proceed to 408, where a difference order is performed, and the process proceeds to 404. The difference order is a transformation applied to time-series data to make the data stationary. To difference the data, the difference between consecutive observations may be determined (e.g., the previous series data may be subtracted from the current series data). Differencing may reduce the changes in the level of a time series, thereby reducing trend and seasonality and stabilizing the mean of the time series.

If a determination is made, at 406, that the sequence is stationary, then the process may proceed to 410, where an auto-correlation function (ACF) is applied, and the process proceeds to 412. Auto-correlation plots are a tool used to determine whether a time series (e.g., sequence) is stationary. The auto-correlation plot may be used to select order parameters for an ARIMA model. The auto-correlation plot displays whether there is a correlation between a time series and its lags. If the time series is correlated with its lags, then there are trend or seasonal components and therefore the statistical properties are not constant over time. In addition to suggesting the order of differencing, The auto-correlation plot can help in determining the order of the M A (q) model.

At 412, a logarithm of the sequence (e.g., time series) may be performed. The logarithm may be performed to further make the sequence stationary.

At 414, a model may be selected. An appropriate ARIMA model may be selected. For example, an ARIMA(p,d,0p,d,0) model or an ARIMA(0,d,q0,d,q) model may be selected.

At 416, parameters may be estimated (e.g., using forward recursion).

At 418, a determination may be made as to whether the residuals appear as white noise. If a determination is made, at 418, that "no" the residuals do not appear as white noise then the process may proceed to 414, where another model may be selected. If a determination is made, at 418, that "yes" the residuals appear as white noise then the process may proceed to 420, where the sequence may be used to predict (e.g., forecast) the release index 126 and the release status 128 of FIG. 1.

FIG. 5 is a flowchart of a process 500 that includes determining a release index and a release status of a software package, according to some embodiments. The process 500 may be performed by one or more software modules of the server 102 of FIG. 1, such as the index determination module 114 and the machine learning module 132.

At 502, features of a software package may be tested (e.g. using test cases) to create test results. At 504, data associated with testing the software package, including the test results, may be retrieved (e.g., from a database). At 506, the data may be parsed to create parsed data. For example, in FIG. 1, one or more of the features 106, the test cases 108, and the test results 110 may be retrieved from the database 112 and parsed using the parser 115.

At 508, a software feature index may be determined based on the parsed data. At 510, a remaining defects index may be determined based on the parsed data. At 512, a test case coverage index may be determined based on the parsed data. At 514, a release release reliability index may be determined based on the parsed data. At 516, an operational quality index may be determined based on the parsed data. For example, in FIG. 2, the software feature index 116 may be determined based on the feature accuracy (e.g., implementation accuracy) 202 and the delayed features 204. The feature accuracy 202 may indicate, based on the test cases 108 and the test results 110, whether the features 106 provide the intended functionality. The delayed features 204 may identify a portion of the features 106 whose implementation has not yet been completed. The defect (e.g., error) index 118 is determined based on a number of currently known defects (e.g., errors) 206, a severity of the defects 208, a priority of the defects 210, and a test cycle 212 in which the defect was discovered. The test coverage index 120 is determined based on a number of passed test cases 214 and a number of failed test cases. The test coverage index 120 may be determined by retrieving the test results 110 from the database 112 and determining how many test cases passed and how many test cases failed. The release release reliability index 122 is determined based on regression testing results 218. The regression testing results 218 may indicate whether any of the existing features have been impacted by the introduction of the new features in the software package. The operational quality index 124 is determined based on (1) resources 220, e.g., human resources available to perform the tasks, such as testing, to release a software package, and (2) environment 222, e.g., environmental factors involved in integrating one piece of software with other pieces of software, such as how the environment is configured, and the like.

At 518, a release index of the software package may be determined (e.g., forecasted using machine learning). At 520, a release status of the software package may be determined. For example, the index determination module 114 may determine a weighted sum of one or more of the indices 116, 118, 120, 122, and 124. The machine learning module 132 may determine (e.g., forecast) the release index 126 and the release status 128. For example, the release index 126 may be a numerical value (e.g., between 0 and 100 or between 0 and 1) that indicates whether the software package is ready to move to the next phase in the development cycle. To illustrate, a lower value may indicate that the software package is not ready to move to the next phase while a higher value may indicate that the software package is ready to move to the next phase. For example, the release index 126 may be a value between 0 and 1, with 0 indicating numerous issues (e.g., not ready) and 1 indicating no issues (e.g., ready). At each phase, after the release index 126 satisfies a particular release threshold (e.g., 0.70), the software package may move from a current phase to a next phase, such as from DIT to SIT, from SIT to UAT, or from UAT to customer release ready. To illustrate, during DIT, after the release index 126 is determined to be at least 0.70, the software package may progress from DIT to SIT. During SIT, after the release index 126 is determined to be at least 0.70, the software package may progress from SIT to UAT. During UAT, after the release index 126 is determined to be at least 0.90 (or 0.95), the software package may progress from UAT to ready for release to customers. Note that the threshold to progress from UAT to release ready may be higher than the other thresholds.

At 522, a determination may be made (e.g., based on the release status and the release index) whether the software package is ready to progress to the next phase (e.g., DIT to SIT, SIT to UAT, UAT to production). If a determination is made, at 522, that the software package is not ready for the next phase, then the software package may be modified (e.g., to address defects/errors), at 524, and the process may proceed to 502 where the features of the software package are re-tested. The process may repeat 502, 504, 506, 508, 510, 512, 514, 516, 518, 520, 522, 524 until the software package is ready for the next phase. If a determination is made, at 522, that the software package is ready for the next phase, then, at 524, the software package may progress from a current phase to the next phase in the software development cycle, e.g., from DIT to SIT, from SIT to UAT, from UAT to production.

Figure 6:
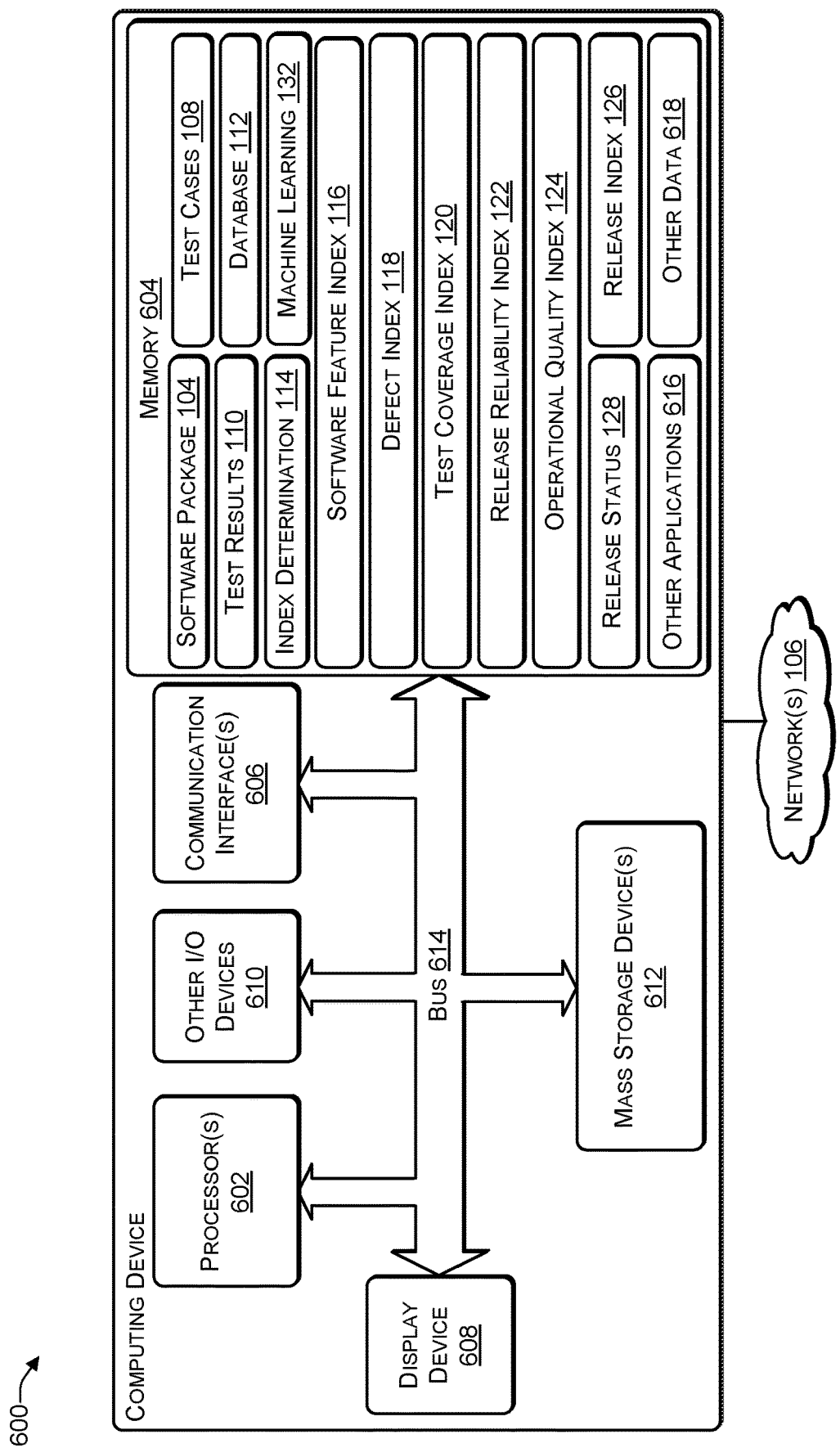
FIG. 6 illustrates an example configuration of a computing device that can be used to implement the systems and techniques described herein.

FIG. 6 illustrates an example configuration of a computing device 600 that can be used to implement the systems and techniques described herein. For example, the computing device 600 may be used to implement the server 102 of FIG. 1.

The computing device 600 may include one or more processors 602 (e.g., CPU, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The computing device 600 may include one or more communication interfaces 606 for exchanging data via the network 106. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 116 and mass storage devices 612, may be used to store software and data. For example, the computer storage media may be used to store the software package 102, the test cases 108, the test results 110, the database 112, the index determination module 114, the software feature index 116, the defect index 118, the test coverage index 120, the release release reliability index 122, the operational quality index 124, the release index 126, the release status 128, other applications 616, and other data 618.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    retrieving, by one or more processors, test results associated with a software package comprising a plurality of features, the test results created by executing a plurality of test cases to test the plurality of features;
    parsing, by the one or more processors, the test results to create parsed data;
    determining, by the one or more processors and based on the parsed data, a software feature index associated with a quality of the plurality of features at a particular point in time of a development cycle;
    determining, by the one or more processors and based on the parsed data, a defect index associated with the defects identified by the test cases;
    determining, by the one or more processors and based on the parsed data, a test coverage index indicating a pass rate of the plurality of test cases;
    determining, by the one or more processors and based on the parsed data, a release reliability index associated with results of executing regression test cases included in the test cases;
    determining, by the one or more processors and based on the parsed data, an operational quality index associated with resources and an environment associated with the software package;
    generating, by the one or more processors, a time series of release indexes, wherein the release index at a given time within the time series is determined based at least in part on the software feature index, the defect index, the test coverage index, the release reliability index, and the operational quality index occurring at the given time in the time series;
    determining, by the one or more processors, whether the release indexes in the time series are stationary;
    applying, by the one or more processors, the time series of release indexes to a sequence of machine learning models to identify a machine learning model in which residuals appear as white noise if it is determined that the time series of release indexes is stationary;

forecasting, by the one or more processors, a release status of the software package using the identified machine learning model, wherein the identified machine learning model employs release index values of the time series of release indexes from more than one phase of the development cycle to forecast the release status of the software package; and modifying, by the one or more processors, one or more features of the plurality of features of the software package upon determining that a subsequent release status of the software package in a subsequent phase of the development cycle fails to satisfy a predetermined threshold, wherein the subsequent release status is forecast using a subsequent machine learning model employing one or more release index values among the previous release index values and a subsequent release index value determined based at least in part on a subsequent software feature index, a subsequent defect index, a subsequent test coverage index, a subsequent release reliability index, and a subsequent operational quality index of the software package determined in the subsequent phase of the development cycle.

2. The method of claim 1, further comprising:

applying, by the one or more processors, a difference algorithm to the time series of release indexes in response to a determination that the time series of release indexes is not stationary, wherein application of the difference algorithm renders the time series of release indexes stationary.

3. The method of claim 1, wherein determining the release index comprises determining a sum of:

multiplying a first weight with the software feature index,
multiplying a second weight with the defect index,
multiplying a third weight with the test coverage index,
multiplying a fourth weight with the release reliability index, and
multiplying a fifth weight with the operational quality index.

4. The method of claim 1, wherein the sequence of machine learning models comprises one or more auto regressive integrated moving average (ARIMA) time series forecasting models.

5. The method of claim 4, further comprising:

applying, by the one or more processors, an auto-correlation operation to the time series of release indexes to select order parameters for the one or more ARIMA time series forecasting models.

6. The method of claim 1, wherein the software feature index is determined based at least in part on:

an implementation accuracy associated with the plurality of features; and
a number of unimplemented features in the software package.

7. The method of claim 1, wherein the defect index is determined based at least in part on:

a number of current defects;
a severity of the current defects;
a priority of the current defects; and
a current phase in the development cycle in which the current defects were determined.

8. A computing device comprising:

one or more processors; and
one or more non-transitory computer readable media storing instructions executable by the one or more processors to perform operations comprising:

retrieving test results associated with a software package comprising a plurality of features, the test results created by executing a plurality of test cases to test the plurality of features;

parsing the test results to create parsed data;

determining, based on the parsed data, a software feature index associated with a quality of the plurality of features;

determining, based on the parsed data, a defect index associated with the defects identified by the test cases;

determining, based on the parsed data, a test coverage index indicating a pass rate of the plurality of test cases;

determining, based on the parsed data, a release reliability index associated with results of executing regression test cases included in the test cases;

determining, based on the parsed data, an operational quality index associated with resources and an environment associated with the software package;

generating, by the one or more processors, a time series of release indexes, wherein the release index at a given time within the times series is determined based at least in part on the software feature index, the defect index, the test coverage index, the release reliability index, and the operational quality index occurring at the given time in the time series;

determining, by the one or more processors, whether the release indexes in the time series are stationary;

applying, by the one or more processors, the time series of release indexes to a sequence of machine learning models to identify a machine learning model in which residuals appear as white noise if it is determined that the time series of release indexes is stationary;

forecasting, by the one or more processors, a release status of the software package using the identified machine learning model, wherein the identified machine learning model employs release index values of the time series of release indexes from more than one phase of the development cycle to forecast the release status of the software package; and modifying, by the one or more processors, one or more features of the plurality of features of the software package upon determining that a subsequent release status of the software package in a subsequent phase of the development cycle fails to satisfy a predetermined threshold, wherein the subsequent release status is forecast using a subsequent machine learning model employing one or more release index values among the previous release index values and a subsequent release index value determined based at least in part on a subsequent software feature index, a subsequent defect index, a subsequent test coverage index, a subsequent release reliability index, and a subsequent operational quality index of the software package determined in the subsequent phase of the development cycle.

9. The computing device of claim 8, further comprising:

applying, by the one or more processors, a difference algorithm to the time series of release indexes in response to a determination that the time series of release indexes is not stationary, wherein application of the difference algorithm renders the time series of release indexes stationary.

10. The computing device of claim 8, wherein determining the release index comprises determining a sum of:

multiplying a first weight with the software feature index,
multiplying a second weight with the defect index,
multiplying a third weight with the test coverage index,
multiplying a fourth weight with the release reliability index, and
multiplying a fifth weight with the operational quality index.

11. The computing device of claim 8, wherein the sequence of machine learning models comprises one or more auto regressive integrated moving average (ARIMA) time series forecasting models.

12. The computing device of claim 11, further comprising:
applying an auto-correlation operation to the time series of release indexes to select order parameters for the one or more ARIMA time series forecasting models.

13. The computing device of claim 8, wherein the defect index is determined based at least in part on:
a number of current defects;
a severity of the current defects;
a priority of the current defects; and
a current phase in a development cycle in which the current defects were determined.

14. One or more non-transitory computer readable media storing instructions executable by one or more processors to perform operations comprising:
retrieving test results associated with a software package comprising a plurality of features, the test results created by executing a plurality of test cases to test the plurality of features;
parsing the test results to create parsed data;
determining, based on the parsed data, a software feature index associated with a quality of the plurality of features;
determining, based on the parsed data, a defect index associated with the defects identified by the test cases;
determining, based on the parsed data, a test coverage index indicating a pass rate of the plurality of test cases;
determining, based on the parsed data, a release reliability index associated with results of executing regression test cases included in the test cases;
determining, based on the parsed data, an operational quality index associated with resources and an environment associated with the software package;
generating, by the one or more processors, a time series of release indexes, wherein the release index at a given time within the time series is determined based at least in part on the software feature index, the defect index, the test coverage index, the release reliability index, and the operational quality index occurring at the given time in the time;
determining, by the one or more processors, whether the release indexes in the time series are stationary;
applying, by the one or more processors, the time series of release indexes to a sequence of machine learning models to identify a machine learning model in which residuals appear as white noise if it is determined that the time series of release indexes is stationary;
forecasting, by the one or more processors, a release status of the software package using the identified machine learning model, wherein the identified machine learning model employs release index values of the time series of release indexes from more than one phase of the development cycle to forecast the release status of the software package; and
modifying, by the one or more processors, one or more features of the plurality of features of the software package upon determining that a subsequent release status of the software package in a subsequent phase of the development cycle fails to satisfy a predetermined threshold, wherein the subsequent release status is forecast using a subsequent machine learning model employing one or more release index values among the previous release index values and a subsequent release index value determined based at least in part on a subsequent software feature index, a subsequent defect index, a subsequent test coverage index, a subsequent release reliability index, and a subsequent operational quality index of the software package determined in the subsequent phase of the development cycle.

15. The one or more non-transitory computer readable media of claim 14, wherein the operations further comprise:
applying, by the one or more processors, a difference algorithm to the time series of release indexes in response to a determination that the time series of release indexes is not stationary, wherein application of the difference algorithm renders the time series of release indexes stationary.

16. The one or more non-transitory computer readable media of claim 14, wherein determining the release index comprises determining a sum of:
multiplying a first weight with the software feature index,
multiplying a second weight with the defect index,
multiplying a third weight with the test coverage index,
multiplying a fourth weight with the release reliability index, and
multiplying a fifth weight with the operational quality index.

17. The one or more non-transitory computer readable media of claim 14, wherein the sequence of machine learning models comprises one or more auto regressive integrated moving average (ARIMA) time series forecasting models.

18. The one or more non-transitory computer readable media of claim 17, further comprising:
applying, by the one or more processors, an auto-correlation operation to the time series of release indexes to select order parameters for the one or more ARIMA time series forecasting models.

19. The one or more non-transitory computer readable media of claim 18, further comprising:
applying, by the one or more processors, a logarithmic operation to the time-series of release indexes.

20. The one or more non-transitory computer readable media of claim 14, wherein the defect index is determined based at least in part on:
a number of current defects;
a severity of the current defects;
a priority of the current defects; and
a current phase in the development cycle in which the current defects were determined.

* * * * *